Figure 3:
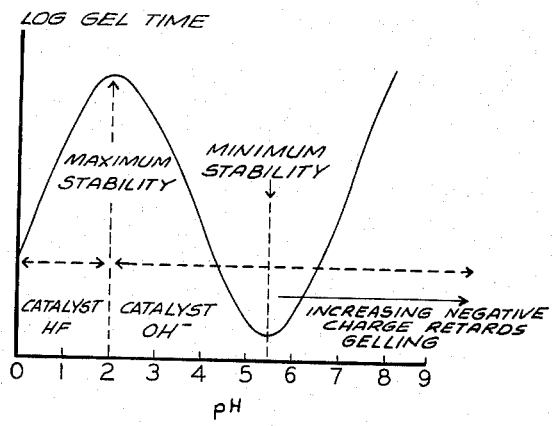

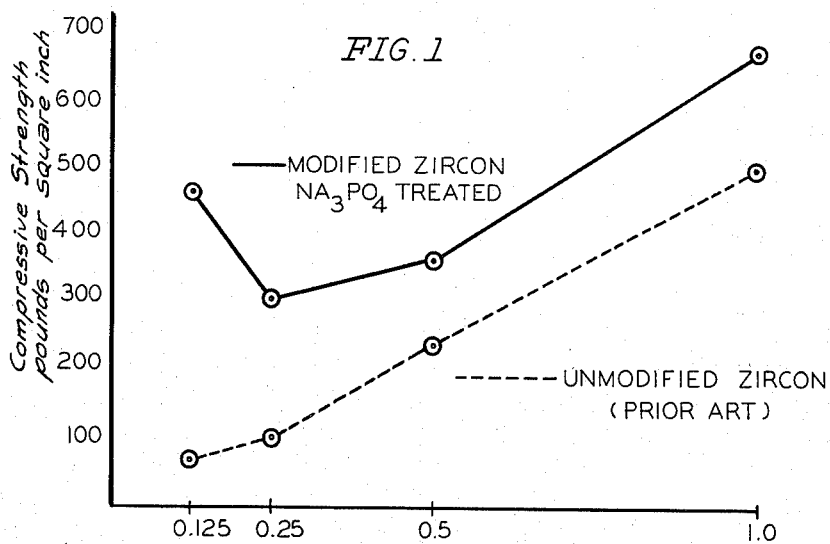
Example 14 Binder (1.0), Diluted with Ethanol to Various Concentrations (0.125 to 1.0), Compared With Prior Art Compositions (See Example 9A.)
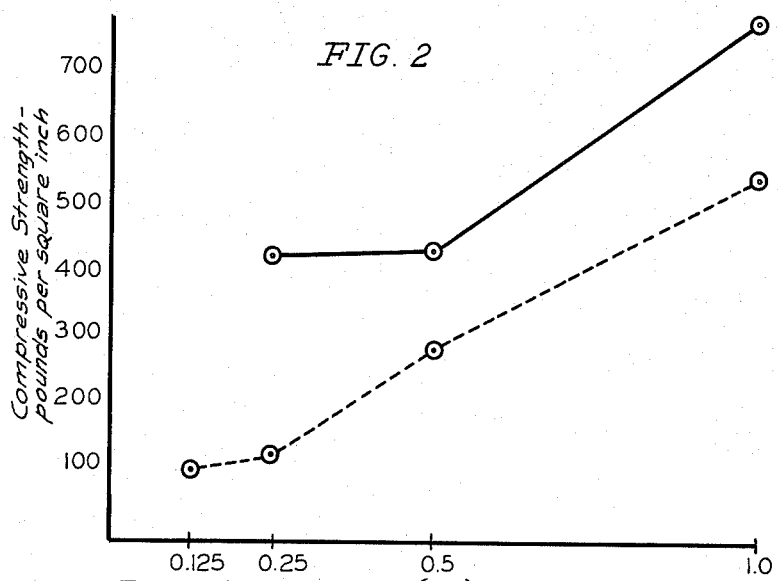
Example 21 Binder (1.0) Diluted With Methanol to Various Concentrations (0.25 to 1.0), Compared With Prior Art Compositions (Example 9A)

United States Patent Office
3,232,771
Patented Feb. 1, 1966

3,232,771
MOLDS AND METHODS OF PREPARING SAME
John W. Pearce, 447 Metz Drive, North Augusta, S.C.
Filed June 29, 1962, Ser. No. 207,172
15 Claims. (Cl. 106—38.35)

This invention relates to molds suitable for the casting of metals, metal alloys and similar materials, and to methods of preparing such molds. This invention further relates to improved refractory materials and to certain gellable compositions and their respective methods of preparation, all of which are useful in the production of molds, such as refractory or investment molds.

Heretofore, molds useful in the casting of metals and metal alloys have been prepared from a variety of refractory materials such as the oxides and silicates of silica, aluminum and zirconium. The refractory materials or powders are usually admixed or slurried with aqueous binder solutions or fluid binder suspensions containing adhesive or bonding agents, such as polysilicic acids, their salts and other colloidal silica or other oxide systems. Such slurries are poured directly over a pattern of the object to be duplicated and are permitted to harden or gel, usually in a matter of a few minutes when suitable gelling agents are used. Otherwise, hours are required for the gelation. The gelled or hardened mass is then stripped from the pattern and serves as the mold for the desired metal casting. Sporadic attempts have been made to improve the performance of the refractories by altering their characteristics and by employing selected fractions of naturally occurring refractory minerals. Numerous improved binder systems have been reported, many of these being based upon the use of organic or inorganic silicates, which are in turn converted to polysilicic acids that polymerize or harden to a gelled mass upon admixture with the refractory powder.

More recently, the use of a third basic component, "gelling accelerators," has been advocated. Such three component systems are illustrated by U.S. Patents 2,811,760, 2,795,022 and 2,931,081. U.S. Patent 2,795,022 (Shaw) teaches the formation of a slurry from the refractory material, a binder containing a liquid lower-alkyl silicate, and a gelling accelerator. The process is conducted by pre-mixing the binder dispersion, which has a pH of about 2.0, with the gelling accelerator, e.g., a 10% aqueous ammonium carbonate solution having a pH of about 7.0. The resulting pre-mixture is then admixed with the selected refractory powder to form the slurry that is finally poured over the pattern and which, upon hardening, forms the desired mold. Alternatively, the binder and refractory may be combined and the gelling accelerator admixed thereto. It is further possible to admix the binder and part of the refractory and store under agitation as slurry A and to admix the remainder of the refractory with additional inert liquid solvent which comprises part of the binder formulation and the gelling accelerator or its aqueous solution and store under agitation as slurry B. Slurry A and slurry B may be admixed to form a gelled or hardened mass as described above. Such processes are frequently referred to as double slurry systems by those skilled in the art.

Certain disadvantages are present in the use of the double slurry type system. Frequently, the refractory material tends to settle out before the hardening or gelation occurs. Also, very substantial amounts of the organic silicate are required to suitably bond the refractory particles and the finished molds tend to exhibit an undesirable crazing or surface cracking. Further, the pre-mixing of the refractory powder with the acidic binder dispersion causes some immediate and continued precipitation of the polysilicic acids which precipitate is not then efficiently used for its intended function of bonding together the refractory particles into a cohesive mold. In addition, stability evaluations have indicated that slurry A is so unstable that it may not be usable in times as short as two weeks. Besides, the power requirements necessary for admixing continuously a binder and refractory of such grossly different specific gravities makes it costly and impractical in plant use applications.

Furthermore, the various factors affecting the gelation time, such as pH, temperature, particle weight and the like, are so critical that in production practice several trial runs must be first conducted each day in order to empirically determine and adjust the ratio of materials so as to achieve the desired gel time.

Therefore, it is an object of the present invention to provide an improved method for the production of molds suitable for the casting of metals, metal alloys, and like materials.

It is a further object of the present invention to provide a novel refractory material whose surface chemical and physical characteristics have been sufficiently altered so as to cause the refractory to participate more effectively in the bonding arrangement with the binder dispersions.

Another object of the present invention is to provide a rapidly gellable composition or slurry from only a refractory powder and a binder, thereby eliminating a need for a third, "gelling accelerator" component.

Still another object of the present invention is to provide a gellable composition that includes a binder phase having a very minor concentration of colloidal silica or other bonding agent.

Another object of this invention is to provide a refractory slurry, the solid phase of which presents strong hydrogen ion accepting or hydroxyl ion accepting properties on at least its outer surface and the binder phase of which exhibits strong hydrogen ion donating or hydroxyl ion donating properties.

It is still a further object of this invention to provide a novel combination of refractory and binder combination which will gel in a specific or consistent manner and require a minimum of chemical control in day to day plant utilization of the novel elements.

By reduction in the binder content of the refractory mold produced from the elements of this invention, it is a further object of this invention to minimize the catastrophic reaction of certain high performance ferro alloys at their melting temperatures with the binder composition.

These and other objects will be apparent to those skilled in the art to which this invention pertains as the description proceeds.

It has been found that excellent molds, e.g. refractory or investment molds, can be prepared by a method that comprises the admixing of (a) a refractory material having hydrogen ion accepting or hydroxyl accepting properties on at least its outer surface and (b) a composition comprising a dispersion of a bonding agent in intimate contact with a hydrogen ion donating or hydroxyl ion donating material, the bonding agent being capable of forming an adhesive or glue for the refractory material as the concentration of the hydrogen or hydroxyl ion in the said dispersion is lowered; contacting the resulting admixture with a pattern of the object to be formed; permitting the admixture to gel while in contact with the pattern; and separating the resulting mold from the pattern. Further, it has been found that improved refractory or investment materials can be made by altering at least their outer surfaces to present increased hydrogen ion or hydroxyl ion accepting properties. It has been found that an improved gellable composition or slurry, having an easily controlled gel time, can be produced from only the thus improved refractory material and a binder dispersion, in contrast with many of the prior art gellable compositions or slurries which require the presence of a separate gelling agent or accelerator in addition to the refractory and binder components.

Preferably, the improved refractory is a particulated refractory material whose outer surface has been modified by reaction with an alkaline or basic material so as to exhibit increased hydrogen ion accepting properties thereon. Such improved refractory is preferably produced from acid, amphoteric or neutral synthetic or naturally occurring refractory powders, such as zircon, sillimanite, mullite, ion-exchange resins, molecular sieves and the like with suitable alkaline agents such as trisodium phosphate, sodium carbonate, sodium bicarbonate, polyfunctional amines and the like. These novel refractories have been produced either by the reaction of the starting refractory with the modifying or buffering agent in the presence of a solvent, followed by the drying under elevated temperatures of the resulting refractory material, or by the direct grinding or milling of the particulated starting refractory with the solid modifying or buffering agent.

In turn, the novel gellable composition or slurry is formed from the mixing together of the improved refractory material and a fluid binder comprising preferably a silicia bonding agent, e.g. organic or inorganic silicate, dispersed in a solvent and a hydrogen ion donating material, such as a dilute aqueous acid. So effective is the improved or modified refractory material that the gel time of the gellable suspension or refractory slurry can be accurately and predictably controlled. Further, the concentration of the bonding agent component of the binder can be reduced to as little as 0.05 to 0.10 the concentration of corresponding bonding agents present in conventional binders currently employed in the manufacture of refractory molds.

The novel method of this invention for the preparation of the finished mold then preferably comprises the admixing of the improved or modified refractory material with the binder composition to form the improved gellable composition or refractory slurry, which in turn is contacted with the pattern of the object to be formed which has been waxed or suitably prepared for packing, followed by the gelling of the slurry and removal of volatile materials to complete the formation of the finished mold, preparatory to the casting or molding of the metal or alloy for which the mold was designed. The steps of contacting the gellable composition or slurry with the selected pattern, the causing of the slurry to gel, and the subsequent removal of the volatile materials from the system to form the finished mold are conducted with standard industry practices. For example, the volatile materials can be removed by the rapid torching technique, or by prolonged drying at room or slightly elevated temperatures, or by the use of vacuum techniques to enhance the rate of drying.

The resulting molds have been utilized for the casting of metals, alloys, pseudo-metals and certain non-metals. Refractory or investment molds, prepared for the precision casting of metals, possess excellent compressive strengths, which characteristic can be accurately controlled by the appropriate selection of the initial improved refractory powder and the choosing of the correct concentration of the bonding agent component of the binder dispersion. Initial studies of the particle structure of the improved molds of this invention reveal that their structure varies markedly from that of the investment or refractory molds currently used in the precision casting field, as typified by those disclosed in U.S. Patents 2,811,760 and 2,795,022.

It is believed that the modifying or altering of the refractory material so that at least its outer surface presents enhanced hydrogen ion accepting properties provides the basis for a controlled precipitation and polymerization of the desired bonding agent, e.g. polysilicic acid, directly on the exposed surface of the refractory. The dispersion of the polysilicic acid in a solvent that readily wets the refractory and is also a strongly hydrogen ion donating material, e.g. a dilute mineral acid, permits a controlled diffusion process to occur whereby the hydrogen ion donating material migrates in the direction of the refractory, carrying the dispersed plasticized polysilicic acid to the immediate area of the hydrogen ion accepting surface. In turn, such polysilicic acid precipitates on the surface as the pH in the immediate environs of the refractory surface is progressively raised so as to enter the pH range of maximum instability of the polysilicic acid.

In like manner, a refractory material prepared so that its outer surface presents enhanced hydroxyl ion accepting properties, provides the basis of controlled precipitation and polymerization of the desired bonding agent, which has hydroxyl ion donating properties.

It has been found that a wide variety of naturally occurring and synthetic refractory powders are suitable as starting materials for the preparation of the improved refractory material or powder whose surface at least has been altered so as to present substantial hydrogen ion accepting properties. Generally, such known refractories as the oxides and silicates of silica, aluminum, zirconium, zinc, tin, magnesium, chromium, titanium, and mixtures thereof are useful as the untreated starting substances. These include the acidic minerals, e.g. zircon, the neutral or amphoteric minerals, especially those whose primary elements are found in group II of the periodic table, i.e. sillimanite, the gel acid minerals, e.g. allophane, and the basic minerals, e.g. zirkelite. Also included are many synthetic materials, including the zeolites, molecular sieves, ion-exchange resins and related materials. In many instances, mixtures of the various natural and synthetic refractory powders have been found suitable.

Preferably, acidic, weakly acidic and neutral or amphoteric materials are employed. Preferred members include zircon ($ZrO_2SiO_2$), sillimanite ($Al_2SiO_5$), zirkenite (mixture of silicates and oxides of zirconium) and mullite (a synthetic mixture of alumina and sand having a generally neutral surface). Still other preferred members include the zeolites having acidic surfaces, such as the calcium-aluminum-silica zeolites (Linde 5A) and the sodium-aluminum-silicates (Linde 4A and Linde X).

Among the other acidic minerals that are operative are the following:

| | | | |
|---|---|---|---|
| Aluminite | Alunite | Amethyst | Anglesite |
| Anhydrite | Barite | Beryl | Betafite |
| Brookite | Carnallite | Cassiterite | Celestite |
| Chrysoberyl | Chrysocolla | Columbite | Cryolite |
| Cuprotungstite | Cryptolite | Descloizite | Diaspore |
| Dumortierite | Euxenite | Fayalite | Frémontite |
| Gibbsite | Glauberite | Glauconite | Gypsum |
| Halite | Halloysite | Halotrichite | Hematite |
| Hemimorphite | Hessite | Hubnerite | Ilmenite |
| Kaolin | Dickite | Kaolinite | Kieserite |
| Kyanite | Lanthanite | Manganotantalite | Melanterite |
| Mirabilite | Monazite | Montmorillonite | Niter |
| Nitrobarite | Nitrocalcite | Nontronite | Olivenite |
| Opal | Pickeringite | Pitchblende | Polyhalite |
| Pyrophyllite | Quartz | Rhodochrosite | Rutile |
| Sal Ammoniac | Samarskite | Sassolite | Scheelite |
| Siderite | Sphalerite | Staurolite | Stibiotantalite |
| Sylvite | Tantalite | Thorotungstite | Topaz |
| Torbernite | Tschermigite | Tungstite | Turquois |
| Uraninite | Vanadinite | Vivianite | Wavellite |
| Wolframite | Wulfenite | Zircon | Triplite |

Among the other operative neutral minerals are the following:

| | | | |
|---|---|---|---|
| Andalusite | Azurite | Chloritoid | Corundum |
| Danalite | Dickinsonite | Fairfieldite | Fuchsite |
| Gahnite | Garnet | Almandite | Andradite |
| Grossularite | Pyrope | Spessartite | Uvarovite |
| Hambergite | Helvite | Malachite | Sillimanite |
| Spinel | | | |

Among the other operative gel acid minerals are included the following:

| | | | |
|---|---|---|---|
| Allophane | Analcime | Calciothorite | Clinohedrite |
| Datolite | Dioptase | Edingtonite | Erdmannite |
| Eucolite | Eucryptite | Eudialyte | Eulytite |
| Gadolinite | Gehlenite | Gismondite | Guarinite |
| Hardystonite | Homilite | Ilvaite | Kasolite |
| Laumontite | Lepidomelane | Mesolite | Noselite |
| Rowlandite | Schorlomite | Sepiolite | Soddyite |
| Thomsonite | Thorite | Tritomite | Uranophane |
| Uranothorite | | | |

Among the operative basic minerals are included the following:

| | | | |
|---|---|---|---|
| Allanite | Amblygonite | Amphibole | Actinolite |
| Anthophyllite | Arfvedsonite | Hornblende | Glaucophane |
| Riebeckite | Tremolite | Apatite | Apophyllite |
| Aragonite | Actacamite | Benitiote | Borax |
| Brucite | Calcite | Carnotite | Chlorite |
| Clinochlore | Danburite | Datolite | Dolomite |
| Epidote | Feldspar | Albite | Anorthite |
| Labradorite | Microcline | Oligoclase | Orthoclase |
| Gay-Lussite | Harmotome | Heulandite | Idocrase |
| Jeffersite | Kernite | Larsenite | Leucite |
| Lithiophillite | Lepidolite | Ludwigite | Magnesite |
| Margarite | Mica | Biotite | Pectolite |
| Muscovite | Phlogopite | Zinnwaldite | Monticellite |
| Natrolite | Olivine | Petalite | Phillipsite |
| Pollucite | Prehnite | Pyroxene | Acmite |
| Augite | Babingtonite | Bronzite | Clinoenstatite |
| Diopside | Enstatite | Hedenbergite | Hypersthene |
| Jadeite | Rhodonite | Spodumene | Roeblingite |
| Roscoelite | Scolecite | Sepiolite | Serpentine |
| Sodalite | Sphene | Stilbite | Strontianite |
| Talc | Tourmaline | Trona | Ulexite |
| Wernerite | Witherite | Wollastonite | Zincite |
| Zirkelite | | | |

In order to activate the preferred acidic, amphoteric, or neutral refractory powders by imparting strong hydrogen ion accepting properties to their surfaces, or in some cases to enhance the weak hydrogen ion accepting properties already presented by their surfaces, a wide variety of basic compositions have been employed.

While some of the starting refractories, especially certain of the synthetic refractory materials, are modest hydrogen ion acceptors, it has been found that such materials can usually be upgraded to a much higher order of activity. Therefore, all those materials whose hydroben ion accepting properties, if any, have been substantially enhanced by this activation treatment are intended to be included within the scope of this invention as improved or activated refractories. The basic activating agents include both organic and inorganic bases and basic salts. Operative inorganic basic compounds are trisodium phosphate, sodium hydroxide, sodium bicarbonate, sodium carbonate, aluminum oxide or hydroxide, magnesium oxide or hydroxide, borax, sodium phosphate and calcium half-chloride (CaOHCl) and the oxides and bases of group I, II and III.

Other suitable organic buffering materials include numerous amine type compounds, especially aliphatic amines, e.g. dimethyl amine, various polyfunction amines such as the mono-, di- and tri-ethanol-amines, and the alkali metal salts of amino acids, e.g. the sodium salts of amino acids. Operative members of these groups further include isobutyl amine, secondary-butyl amine, tertiary-butyl amine, diethylene triamine, ethylene diamine, n-hexylamine, hexanediamine-1,6, propane diamine-1,3, propane diamine-1,2, diethanolamine, triethylene tetramine, triethanolamine and monoethanolamine. Also found useful are such aromatic amines as aniline, napthylamine, m-phenylene diamine, o-phenylenediamine, and p-phenylenediamine, such mixed aromatic-aliphatic amines as N,N-diethylaniline and N,N-diethyl-p-phenylenediamine and N-ethylaniline and such heterocyclic amines as pyridine, pyrrole and pyrrolidine. Other amino acid activating or buffering agents include the sodium salts of beta-alanine and glycine.

The concentration of the modifying agent employed may vary widely in relationship to the amount of refractory powder. For example, as little as 0.64 to 10 parts by weight of trisodium phosphate dissolved in 100 parts of water have been found sufficient to give substantial hydrogen ion accepting properties to 450 to 810 parts by weight of zircon refractory powder. In case of soda ash or of sodium bicarbonate 0.45 part per 100 parts of zircon sufficiently modifies the zircon surface to produce hydrogen ion accepting properties. When sodium hydroxide was used, 0.25 part per 100 parts of zircon rendered the zircon surface ion accepting within the scope of this invention. The resulting aqueous slurry of the refractory has been suitably dried at temperatures of from room to about 200° F. after filtration. When elevated temperatures, e.g. 150–200° F. are employed, the activated refractory powder is satisfactorily dried in from 10 to 20 hours.

Alternatively suitable results have been obtained by grinding the refractory powder intimately with the solid modifying agent, by using ball and colloid mills and other similar grinding equivalent. For example, a zircon refractory has been ball-milled with as little as 0.25 percent of its weight of sodium hydroxide or trisodium phosphate and found to exhibit suitable hydrogen ion accepting properties.

With either the solution or the grinding technique, the precise amount selected will vary with the particle size of the selected refractory powder and with the degree of acidity of its surface. Thus, the greater the acidity of the untreated refractory powder, the higher will be the concentration of the alkaline modifying or hydrogen ion acceptor agent that is required.

When the naturally occurring acidic and neutral minerals are employed as the starting refractory powders, the preferred basic activating or buffering agents are the inorganic bases and salts, especially trisodium phosphate, sodium carbonate and sodium bicarbonate. When the synthetic refractory materials are selected, such as zeolites, molecular sieves and various ion-exchange resins, the various amine or polyamine type modifying or buffering agents are preferably employed.

In carrying out the activation with a basic modifying agent, the trisodium phosphate, for example, is preferably dissolved in water and admixed with a selected refractory, e.g. zircon. The resulting admixture is permitted to stand at room temperature and the treated refractory subsequently filtered off and dried, preferably at elevated temperatures, e.g. 180° F.

When the amine type modifying agents are employed, it may be preferable to dissolve these in organic solvents and use the solution technique for the treatment of the refractory powder. In such cases, from 10 to 20 parts by weight of the selected amine are usually required to suitably activate 150 parts by weight of the refractory powder. Likewise, the treated refractories are then air dried at room or only slightly elevated temperatures. Preferably, polyfunctional amines of relatively low volatility are employed.

The activated or treated refractory powder whose surface characteristics have been altered to offer substantial hydrogen ion accepting properties usually exhibit a pH at the surface of from about 5 to 13 (preferably about 6 to 8).

The Examples 1 to 5, inclusive, illustrate the detailed methods of preparation of the novel activated refractory materials.

In preparing the gellable suspension or slurry actually used in the production of the mold, a wide variety of materials have been employed in forming the binder or dispersion phase that includes both the bonding or adhesive agent and the hydrogen ion donating material. Such binder dispersion, together with the impoved refractory material, then forms the two component gellable suspension or slurry. The range of colloidal silica-type bonding agents is wide, varying from the hydrolyzed organic silicates through the various silica sols and includes the partially and completely neutralized inorganic silicates. Many alkyl silicates are operative and include the various monomeric and polymeric ethyl silicates and other lower alkyl silicates. Preferred among these are the hydrolyzed products of tetraethyl orthosilicate, the condensed ethyl silicate (a mixture of approximately 85% tetraethyl orthosilicate and 15% polysilicates), and ethyl silicate (Ethyl Silicate 40, a mixture of ethyl polysilicates having an average of 5 silicon atoms per molecule and marketed by Anderson Chemical Co., and Carbide Chemicals Corp.). Preferred among the inorganic silicates are the sodium and potassium silicates and fused silica emulsion—suspended either in alkaline or acid continuous phases. Still other bonding agents are the esters and ortho esters of silica, aluminum, boron, titanium, tin and lead. Also, other inorganic and organic esters of group II and IV elements of the periodic table are operative.

In composing the binder, the preferred organic silicates are dispersed in an organic solvent, preferably a polar organic solvent, and a hydrogen ion donating material, e.g. an organic or inorganic acid. The resulting at least partially hydrolyzed reaction product comprises chiefly the colloidal polysilicic acids. Among the polar organic solvents, the aliphatic alcohols, such as the lower alkanols, produce excellent results. The methanol, ethanol, isopropanol and the various butanol members all give satisfactory results and are mutually soluble with the preferred aqueous acids. Water soluble ethers such as dioxane and polyglycols, although less practical, are operable. The lower alkanols, in addition to their solvent or vehicle function, serve to act as plasticizing species on the colloidal polysilicic acids and serve as wetting agents for the improved refractory materials with which they subsequently come in contact.

The preferred acids serving as the hydrogen ion donating compounds are the mineral and organic acids whose pH values are 4.0 or less. These include the alpha-halo- and alpha,alpha,-dihalocarboxylic acids, various organic keto acids and the like. Satisfactory binders have been prepared with hydrochloric, sulfuric and trichloroacetic acids. Aromatic and aliphatic carboxylic acids, although operable, are not preferred over substituted analogous structures showing stronger acidity function.

The preferred pH range of the binder is from between about 1.0 to 3.0, especially with the organic silicates, but the range from between about 1.0 to about 5.0 is operative for many of the bonding agents or gluing materials that are employed.

In the prior art polysilicic acid binders, the concentration of acid, e.g. HCl, is deemed very critical and it has been reported (J.A.C.S. 72, 5705, 1950) that the concentration of acid per liter of binder should exceed 0.002 mole, using ethanol as the diluent in order to achieve proper hydrolysis and stability of the hydrolysate. Such a prior art composition is set forth in Comparative Example A, in which the organic silicate is about 63 percent on a weight basis.

In contrast, while the binder of Comparative Example A produces satisfactory results and gives the desired short gelled time in the method of the present invention, it has been found that less than $\frac{1}{10}$ the amount by weight of the organic silicate can be employed with the appropriate solvent and aqueous acid to yield very stable binder dispersions. It has been observed that an organic silicate content of less than about 8 percent has not only produced a stable binder that upon subsequent admixing with the improved refractory yields a slurry of short gel time, but the resulting completed mold exhibits a compressive strength comparable to that produced by the best prior art practice (see Example 9) utilizing the Standard Binder of Comparative Example A.

The composition and methods of preparation of the preferred binders are further illustrated in the examples.

In producing the molds for the casting of the metal, the improved refractory material and the binder composition are admixed, preferably in apparatus producing heavy shearing action, especially since the specific gravity of the binder system is about 1.0 to 1.1, whereas the improved refractories may exhibit specific gravities in the order of 6.0 or more. Elimination of the third or gelling accelerator component of the prior art, has made it easier to automate the mixing of the refractory and binder. This has been simply accomplished in a continuous mixing operation by feeding the improved refractory powder directly to a mixing head to which the liquid binder is also delivered by means of a positive displacement pump. The resulting slurry phase is then fed directly onto the previously formed pattern and permitted to gel. The precise gelling time may be determined experimentally in order to fit the production schedule. Frequently, gel times in the order of 1–3 minutes are utilized for the production of molds designed for precision casting of metals. Among the factors affecting the gelation time are the pH, the nature of the solvent or continuous phase of the binder, the amount of water present, temperature, particle weight of the polysilicic acids or other bonding component, and the concentration of the polysilicic acids and the acid serving as the hydrogen ion donor. In the method of this invention, the gelation time can be predictable and accurately controlled by the appropriate adjustment of these variables, as illustrated in the examples.

After the pattern has been covered and the gellable composition or slurry permitted to gel, the gelled mass or crude mold is opened up or actually stripped from the pattern. In the finishing operation, the volatile materials, such as alcohol and occluded water, are removed by any standard technique. These may be removed either prior to or subsequent to the stripping of the mold from the pattern. Rapid torching, i.e. the firing of the mold at temperatures of up to 2,000° F., has been satisfactorily employed. Likewise, the volatiles can be more slowly removed by evacuation in an oven at temperatures of up to 200° F. Prolonged standing at room temperature will produce sufficient evaporation of the volatiles.

The following examples illustrate the processes and compositions of this invention.

COMPARATIVE EXAMPLE A

One thousand and fifty ml. of ethyl silicate (Ethyl Silicate 40—Carbide Chemicals Corp.) was dispersed in 690 ml. of ethanol (Synasol). To this dispersion was added 1.25 ml. of concentrated HCl in 82 ml. of water and the resulting binder solution stirred for one hour during which the temperature increased from 70° F. to 110° F. The cooling dispersion was stored overnight in a sealed container so that equilibrium of the hydrolysis of the ethyl silicate was reached.

The resulting binder dispersion is hereafter denoted as "Standard Binder" and is a typical binder composition as employed in the prior art double slurry and external gelling agent systems.

EXAMPLE 1

A solution of sodium bicarbonate was prepared by dissolving 10 parts of $NaHCO_3$ in 100 parts of water and this solution was admixed with 450 parts of a fine particle size distribution zircon refractory at room temperature. After standing for 18 hours the wetted zircon was separated by filtration in a Buchner funnel using a suitable Whatman filter paper. A filtrate volume of 45 parts was isolated. The quasi-dry zircon solids were broken up and placed in an oven at 93° C. (200 F.) for twenty hours. The dried modified zircon solid was then milled for three hours in a two gallon porcelain mill using agate balls and a very fine refractory powder was produced. When 66 parts (g.) of this refractory powder were combined with 10 parts volume (ml.) of the Standard Binder of Comparative Example A, the resultant mixture gelled to a hard, solid refractory mass in two minutes and 43 seconds.

EXAMPLE 2

A solution of 5 parts of trisodium phosphate in 50 parts of water was admixed with 450 parts of untreated zircon refractory to form a very thick, putty-like paste. After mixing for 30 minutes at room temperature, the putty-like mass was heated with a Meeker burner to appoximately 300° C. with continuous mixing being accomplished by rotating the container which also contained 36 steel spheres of various diameters of from ¼ to 1 inch. After 30 minutes a fine, free flowing refractory powder was isolated which gelled 5 parts volume (ml.) of the Standard Binder in from 3 to 30 minutes, respectively, where 30 down to 7 parts (g.), respectively, of the refractory powder were admixed.

EXAMPLE 3

A solution of 0.6 part (g.) of ethylene-diamine in 50 parts (ml.) of ethanol was admixed with 450 parts (g.) of zircon in a closed container and allowed to stand for 22 hours. The treated zircon refractory was isolated by filtration as above and placed on a polyethylene sheet to dry at 26° C. for 24 hours, after first crumbling the filter cake. The dried refractory was pulverized further by mechanically forcing it through a 30-mesh copper screen and a fine, free flowing refractory powder was produced. When 66 parts (g.) of this powder were combined with 10 parts (ml.) of the Standard Binder, the resulting mixture gelled to a solid refractory mass in 4 minutes and 18 seconds.

EXAMPLE 4

Charged into a two gallon porcelain mill containing agate balls were 10 parts (g.) of sodium hydroxide solid (reagent grade) and 900 parts (g.) of zircon refractory powder. The admixture was milled in a pebble mill in the customary fashion for a period of three hours. A fine, free flowing powder was isolated which was combined in the amount of 4 parts with 62 parts (g.) of unmodified zircon powder and admixed with 10 parts (ml.) of Standard Binder to produce a gelled, solid refractory mass in 18 seconds.

EXAMPLE 5

When 10 parts (g.) of solid crystalline $Na_3PO_4$ and 450 parts (g.) of zircon refractory powder were charged into a two-gallon porcelain mill containing agate balls and milled for three hours, a smooth, free flowing refractory powder was produced. When 33 parts (g.) of this refractory powder were combined with 99 parts (g.) of unmodified zircon refractory and 21 parts (ml.) of Standard Binder and rapidly mixed, the resulting slurry was poured as a facing to a pattern template representing the drag side of a metal mold cavity. The resulting facing gelled in one minute and twenty-five seconds and was easily removed from the pattern template. After removal, the facing surface was ignited by a gas torch (isobutane gas) and allowed to burn for two minutes in the atmosphere, after which it was extinguish by covering with a galvanized steel envelope to cause the alcohol to continue "bleeding out" of the mold facing. After being extinguished for three minutes, the mold was reignited and the remaining combustible matter allowed to burn off. In like manner the cope portion of a metal mold cavity was prepared and both cope and drag were placed in an oven at 1800° F. for 4 hours for final cure of the structure. After removal from the oven and suitable joining of the cope and drag according to customary foundry practice, type H-13 steel was cast to the cavity and a satisfactory, smooth quality casting of close dimensional tolerance was obtained.

EXAMPLE 6

An alcohol suspension of acidified ethyl silicate, which had been reacted with water to produce a stable polysilicic acid dispersion (prepared as in Comparative Example A), in the quantity of 10 parts (ml.) was combined with 6 parts (g.) of a dehydrated, crystalline free flowing powdered synthetic zeolite (Linde molecular sieve 4A). The resultant admixture was vigorously stirred for 30 seconds and a gelled solid refractory mass resulted within 10 minutes. This mass was ignited and cured as described in Example 5 above.

EXAMPLE 7

Suspension using loaded sieve.

A combination of 10 parts (ml.) of Standard Binder and 10 parts (g.) of a synthetic zeolite (Linde type CW-1215 molecular sieve) which had been loaded with triethanolamine to the extent of approximately 20% of the mass of the synthetic zeolite, was intimately mixed, with vigorous stirring, for one minute. The resultant suspension gelled to a solid refractory mass within 4 hours. The resultant slurry was poured over a pattern surface, gelled, torched and cured in a manner described in previous examples.

EXAMPLE 8

When a loaded synthetic zeolite (Linde type CW-X1220 molecular sieve), containing triethyleneteramine as the activating agent was slurried as described in Example 7 above, the resulting suspension gelled in three minutes and 42 seconds.

EXAMPLE 9

(A) *Prior art procedure*

A mixture of 11.15 parts (volume) of Standard Binder was diluted with 11.15 parts (ml.) (volume) of ethanol and mixed with 149 parts (g.) (weight) of untreated zircon. To this mixture was added 0.6 part (ml.) of a 10% aqueous solution of ammonium carbonate and cylindrical shapes one inch in diameter and two inches high were cast and gelled in five minutes. The gelled cylinders were removed from the mold and ignited for 30 seconds, and then covered with a glass beaker for two minutes to extinguish the burning alcohol and other combustibles. The beaker was then removed and the samples reignited and allowed to burn until the combustibles were exhausted. Such samples were placed in the oven at 1800° F. for four hours, removed and allowed to cool. The resultant sample had a compressive strength of 250 lbs. per square inch when evaluated in a Dietert Strength Machine (described in FIG. 243, page 384, "Foundry Core Practice," Harry W. Dietert, American Foundrymen's Society, Chicago, Illinois (1952)).

(B) *Procedure using activated refractory*

When the diluted Standard Binder, as described above, was mixed with 149 parts (g.) of $Na_3PO_4$ treated refractory (Example 2) but without any ammonium carbonate solution, the mixture gelled in five minutes. After treatment as described above, the compressive strength of this sample was found to be 378 pounds per square inch.

In like manner, other comparative samples at varying binder dilutions were produced and tested, as shown on FIGURE 1, using ethanol and methanol, respectively, as the diluent. All data in FIGURE 1 were obtained by statistical averaging of the compressive strengths tested and reported by an independent testing laboratory.

It is known that there is a close relationship between pH and the stability of the polysilicic acids or colloidal silicas that form the bonding agent in the binder dispersion. As seen from FIGURE 2, the colloidal polysilicic acids have maximum stability at a pH of 2 and over the pH range of between about 1 and about 3. Between a pH of about 4 and about 6 the stability decreases very rapidly and gelling or precipitation occurs within this range. The point of maximum instability or gelation is at a pH of about 5.5.

EXAMPLE 10

An ordinary talc mineral displaying alkaline property, alkaline pH, when suspended in distilled water, in the quantity of 225 parts by weight, was ground with one part by weight of reagent grade sodium hydroxide in an ordinary pebble mill for three hours. A smooth free-flowing power was produced, which in the quantity of 45 parts by weight (g.) when combined with 10 parts by volume (ml.) of the Standard Binder solution gelled within 5 minutes. When the precedure described in Example 5 was followed, a suitable cavity for the casting of ferro alloys resulted.

From this mixture, approximately 800 parts (ml.) of binder at standard strength was obtained. To the 800 parts (ml.) of binder was added 5600 parts (ml.) of 95% ethanol. A clear transparent stable suspension resulted which was transferred to a closed glass container for equilibration and storage. The resultant mixture of dilute binder was stable over a period of many months.

In like manner, additional experimental binders were prepared (Examples 14–24).

| Example | 14 | 15 | 16 | 17 | 18 | 19 | 20 | 21 | 22 |
|---|---|---|---|---|---|---|---|---|---|
| Ethyl Silicate, ml. percent | 525 | 400 | 1,050 | 1,050 | 1,050 | 1,050 | 525 | 525 | 525 |
| Ethanol, ml | 345 | 400 | 690 | 690 | | | 345 | | 345 |
| Methanol, ml | | | | | | | | 345 | |
| Isopropanol, ml | | | | | 690 | 690 | | | |
| HCl (conc.), ml | .625 | 8 | 1.25 | | 1.25 | | | | 2.5 |
| $H_2SO_4$ (conc.), ml | | | | 0.8 | | 0.8 | | 0.8 | |
| $Cl_3CCOOH$, g | | | | | | | 2.45 | | |
| $H_2O$, ml | 41 | | 82 | 82 | 82 | 82 | 41 | 41 | 41 |

EXAMPLE 11

An ordinary talc mineral displaying alkaline property, alkaline pH in the amount of 450 parts by weight (g.) was treated with 25 parts by weight of an 85% sirupy phosphoric acid solution which had been dissolved in 100 milliliters of water. The mixture was allowed to stand overnight, at room temperature. As set forth in Example 1, the wet talc was separated by filtration using a Buchner funnel and a suitable Whatman filter paper. Quasi-dry zircon solids obtained from the filtration were broken up and placed in an oven at 150° F. for 23 hours. The dry modified talc was then milled according to the procedure of Example 1, and a very fine free-flowing refractory powder was obtained. When 50 parts (g.) of this improved refractory material was combined with 10 parts by volume of a sodium silicate solution prepared by mixing 5 parts by volume (ml.) of a 42° B. sodium silicate solution with 5 parts by volume (ml.) of water dioxane mixture comprising 3 parts by volume of water to 1 part by volume of dioxane, the resulting mixture of the talc and the aqueous binder gelled within 4 minutes to give a hard refractory mass which could be used in the preparation of cavities for the casting of ferro alloys. In this case, it was necessary, however, to drive the water from the gelled mass either by the use of direct torching procedures or immediate placement of the gelled mass in the oven at temperature above 1000° F. for a period of two hours.

EXAMPLE 12

In a suitable size glass vessel 1050 parts (ml.) of Ethyl Silicate 40 were combined with 690 parts (ml.) of 95% isopropanol. To this mixture were added 82 parts (ml.) of distilled water and 0.8 parts (ml.) of concentrated sulphuric acid. The concentrated sulfuric was reagent grade and 96% $H_2SO_4$. All of the ingredients were combined at 70° F. and the mixture was stirred manually forming a clear transparent solution. Temperature rose during the first 30 minutes to 82° F., after which it subsided. The resultant mixture was placed in a closed glass container and allowed to stand overnight so that the hydrolysis reaction could equilibrate. After equilibration, when 10 parts of the resultant binder solution (by parts by volume) (ml.) were treated as described in accordance with Example 1, the resultant comminuted gelled within 6 minutes.

EXAMPLE 13

In a suitable glass vessel, 525 parts (ml.) of Ethyl Silicate 40 was mixed with 345 parts (ml.) of 95% ethanol. To this mixture was added 41 parts (ml.) of distilled water, in which 2.45 parts (g.) of trichloroacetic acid had been dissolved. Although the mixture had been accomplished at 75° F., during the next 45 minutes the temperature rose to 118° F. and then started to subside.

| Example | 23 | 24 |
|---|---|---|
| o-Ethyl Silicate, ml | .525 | |
| Ethyl Silicate condensed, ml | | 525 |
| Ethanol, ml | 345 | 345 |
| $H_2SO_4$, ml | 0.8 | |
| $Cl_3CCOOH$, g | | 2.45 |
| $H_2O$, ml | 41 | 41 |

When methanol and ethanol were used as solvents, the typical type of ethanol exotherm was observed. In the case of isopropanol, a somewhat attenuated exotherm was observed.

Applying these facts to the process of this invention, it is believed that the activation or alteration of the refractory powder causes at least its outer surface to exhibit a higher pH, usually between about 4 and 9 or higher. When the acidic and neutral starting refractory materials are employed, the character of the surface is indeed changed from acid to alkaline, and the desired strong hydrogen ion accepting properties are thus present. Likewise, the binder phase, comprising preferably the polysilicic acids or colloidal silicas dispersed in a lower alkanol and being stabilized by the preferred dilute mineral acids, exhibits a pH of about 2, with strong hydrogen ion donating properties.

This differential in pH and the accompanying attraction of the hydrogen ion donating phase for the surface of the refractory provide a driving force that may cause diffusion of the polysilicic acids in the direction of the refractory surfaces. As the polysilicic acid particles approach the refractory surfaces, the pH of the binder phase, in which the polysilicic acids are dispersed, is raised to the 4.0–6.0 range, the recognized instability range for such colloidal silica materials. In such instability pH range, the colloidal polysilicic acids readily precipitate or polymerize on the surface of the refractory material. As precipitation or polymerization of the polysilicic acids continues, the desired gelation or hardening occurs.

Whether or not the reaction occurring at the refractory surface or interface with the binder system is a primary surface neutralization or secondary attraction by virtue of Van der Waals forces, polarity or other action has not been confirmed. In any event, the change in the environs surounding the polysilicic acids as the treated refractory is wetted by the binder dispersion is sufficiently dramatic so as to cause the desired instability and subsequent deposition of the precipitated silica matter, and the attractive forces on the refractory surface are sufficiently strong to prevent the precipitated polysilicic acids from resolubilizing to any significant extent.

Since it has been observed that the polyfunctional bases appear experimentally to provide a more activated surface to the refractory than the monofunctional bases, it is possible that the first and/or second functional group, i.e. sodium ion in the case of the use of tri-sodium phosphate as the buffering agent, may be directly attached or associated with the refractory surface, perhaps through reaction, with free hydroxyl groups of the zirconyl ion or other metallate ion leaving the remaining one or two functional groups free to serve as hydrogen ion acceptors for the alcohol-water-polysilicic acids binder system. Such second or third functional groups, being alkaline, may tend to neutralize the acid grouping of the binder system thus causing the pH of the binder to be elevated and the plasticized polysilicic acids to be precipitated.

It is suggested that the concentration or collection of the polysilicic acids in the immediate area of the surface of the treated refractory by the driving force of the reaction and their subsequent polymerization in effect causes the efficient precipitation of the bonding agent directly on the surface of the refractory. The efficiency of such bonding system may explain the experimental observations that exceedingly small amounts of the polysilicic acids can be employed in the formation of molds that exhibit as good compressive strengths as those molds produced by the uneconomic prior art processes with heavy concentrations of colloidal silicas.

In Example 9, the compressive strengths (see FIGURE 1) of various compositions of the invention are compared with those of the prior art using the external gelling agent method. The external gelling agent process casts (see dotted lines in FIGURE 1) show a gradual decline in the compressive strength as the polysilicic acids content of the Standard Binder was progressively reduced, using ethanol and methanol, respectively as the diluent.

The solid lines represent the compressive strengths of the casts obtained from the present invention set forth in Example 9 using the various Standard Binder dilutions, but without addition of any gelling agent. Not only do the modified or activated zircon refractories in Example 9 exhibit superiority over all ranges of dilution of the polysilicic acids content, but they unexpectedly evidence a strong bonding strength in the lower colloidal silica content ranges. For example, a 0.125 dilution or one-eighth strength polysilicic acids content yields molds with this same compressive strength as those obtained with the full strength polysilicic acid binders in the prior art double slurry method.

Further, the completed molds of this invention exhibit less surface cracking or crazing than molds produced in comparable fashion from the double slurry methods. The initial studies of particle structure show that the structure of the completed casts of this invention varies considerably from that characteristic of the casts produced by double slurry methods. Dimensional stability and scratch test data further confirm the differences in these casts.

The desired conditions for the operation of the production of the molds are more easily controlled since the gelling times are controllable within wide limits. The maximum concentration of acid previously permitted by the prior art binder system has been altered radically so that very substantial amounts of acid in relationship to the polysilicic acids content can be tolerated. Consequently, the binder composition of the present invention is stable and can be marketed as a dispersion.

Likewise, the treated or activated refractory is stable for prolonged periods of time. Production usage thus requires only the admixing of the binder dispersion and the treated refractory in the form of the slurry, without the necessity for daily adjustment of the binder gelling agent system as has been usually required with prior art binders in response to changes in temperature, colloidal silica particle size changes and the like.

The obtaining of strong molds with both high and low concentrations of the polysilicic acids has produced another unexpected result. Frequently, undesirable mold reactions occur between the highly reactive metals being cast and the silicas in the mold. For example, such undesirable mold reactions frequently take the form of a metal oxide reaction with the silica, causing imperfections in the castings sometimes known as "measles." Analyses of the mold reaction residues from the comparative molds produced by the prior art technique (Example 9A) and those of the present invention (Example 9B) reveal in the lower colloidal silica dilutions that the percentages of silica found upon analysis in the reaction residues from the mold of the present invention are significantly less than the corresponding percentages found in the mold residues of molds produced by the external gelling agent technique.

Various modifications can be made in the processes and compositions of this invention without departing from the spirit or scope thereof and it is to be understood that the invention is limited only by the scope of the appended claims.

I claim:

1. A gelled refractory mold composition, the gelation occuring upon admixture of compositions A and B, which comprises in admixture:
   (A) a polysilicic acid binder solution composition comprising the admixture of about 3.2 to 8 percent by weight of an organic silicate, a polar organic solvent for the organic silicate, an acid and water, the composition A having a pH such that the polysilicic acid remains in solution; and
   (B) a refractory composition comprising a particulate refractory material, at least the surface of which has a pH prior to admixture with composition A such that the resulting pH of the admixture of compositions A and B is between about 4–6 and such that polysilicic acid is precipitated on the surface of the refractory material, the gelled mold composition being suitable for subsequent heating to remove volatile materials.

2. The composition of claim 1 wherein in the composition B the surface of the refractory material has hydrogen ion accepting properties as a result of the admixture of the refractory material with a material selected from the group consisting of organic and inorganic bases.

3. The composition of claim 1 wherein the binder composition A has a pH between about 1–3 prior to admixture with composition B and wherein the refractory composition B has a pH between 6–8 prior to admixture with composition A.

4. The composition of claim 1 wherein the composition A has a pH between about 1–3 prior to admixture with composition B and wherein in composition B the surface of the refractory material has a hydrogen ion accepting property prior to admixture with composition A.

5. The composition of claim 1 wherein the composition A has a pH between about 1–3 prior to admixture with composition B and wherein in the composition B the surface of the refractory material has hydroxyl ion accepting properties prior to admixture with composition A.

6. The composition of claim 1 wherein the ratio B to A is between about 8 to 1 and 1 to 1.

7. A gelled refractory mold composition, the gelation occurring upon admixture of compositions A and B, which comprises:
   (A) a polysilicic acid binder solution composition comprising the admixture of about 3.2 to 8 percent by weight of a lower alkyl silicate, a lower alkanol, an acid and water, the composition A having a pH between about 1–3 such that the polysilicic acid remains in solution; and
   (B) a refractory composition comprising a particulate refractory material at least the surface of which has a pH prior to admixture with composition A such that the resulting pH of the admixture of A and B is between about 4–6 and such that the polysilicic acid is precipitated on the surface of the refractory material, the gelled mold composition being suitable for subsequent heating to remove volatile materials.

8. The composition of claim 7 wherein the lower alkanol is ethanol.

9. The composition of claim 8 wherein the acid is hydrochloric acid.

10. The composition of claim 9 wherein the lower alkyl silicate is ethyl silicate.

11. The composition of claim 10 wherein the ratio of B to A is between about 8 to 1 and 1 to 1.

12. The composition of claim 11 wherein in the composition B the surface of the refractory material has hydrogen ion accepting properties as a result of the admixture of the refractory material with a material selected from the group consisting of organic and inorganic basic materials.

13. The composition of claim 12 wherein the basic material is trisodium phosphate.

14. The composition of claim 7 which in addition has substantially all volatile materials removed.

15. The composition of claim 1 which in addition has substantially all volatile materials removed.

References Cited by the Examiner
UNITED STATES PATENTS

| | | | |
|---|---|---|---|
| 2,211,789 | 8/1940 | Merrick et al. | 106—38.2 |
| 2,218,243 | 10/1940 | Lathe et al. | 106—55 |
| 2,277,733 | 3/1942 | Wainer et al. | 106—55 |
| 2,818,619 | 1/1958 | Bradley et al. | 106—38.35 XR |
| 2,911,310 | 11/1959 | Shaw et al. | 106—38.2 |
| 2,926,098 | 2/1960 | Ilenda et al. | 106—38.35 |
| 2,984,576 | 5/1961 | Alexander et al. | 106—55 |
| 3,000,750 | 9/1961 | Felletschin | 106—308 |
| 3,027,265 | 3/1962 | Miericke | 106—38.2 |

ALEXANDER H. BRODMERKEL, *Primary Examiner.*

MORRIS LIEBMAN, *Examiner.*